(12) United States Patent
Lin

(10) Patent No.: US 6,189,948 B1
(45) Date of Patent: Feb. 20, 2001

(54) MOTORIZED SUN-SHADE ASSEMBLY

(76) Inventor: Betty Lin, No. 125, Fa-Hua St., Tainan City (TW)

( * ) Notice: Under 35 U.S.C. 154(b), the term of this patent shall be extended for 0 days.

(21) Appl. No.: 09/235,032

(22) Filed: Jan. 21, 1999

Related U.S. Application Data

(63) Continuation-in-part of application No. 09/204,962, filed on Jan. 21, 1999, now abandoned.

(51) Int. Cl.⁷ .......................................................... B60J 3/02
(52) U.S. Cl. .................. 296/97.4; 296/97.8; 160/370.22; 160/310; 160/DIG. 2
(58) Field of Search ................................. 296/97.8, 97.4, 296/143; 160/75, 314, 370.22, DIG. 3, DIG. 2, 22, 66, 67, 68, 70, 310

(56) References Cited

U.S. PATENT DOCUMENTS

| | | | | |
|---|---|---|---|---|
| 5,438,780 | * | 8/1995 | Winner | 160/370.22 X |
| 5,653,278 | * | 8/1997 | Cheng | 160/370.22 |
| 5,791,721 | * | 8/1998 | Lin | 296/97.8 |
| 5,896,910 | * | 4/1999 | Chen | 160/370.22 |

\* cited by examiner

*Primary Examiner*—D. Glenn Dayoan
*Assistant Examiner*—Jason Morrow
(74) *Attorney, Agent, or Firm*—Pitney, Hardin, Kipp & Szuch LLP

(57) ABSTRACT

A motorized sun-shade assembly has a sun-shade device and a drive device. The sun-shade device includes a housing, a horizontal roller mounted rotatably in the housing, a screen having a lower edge connected to the roller, and a stretching arm unit having an upper arm with an upper end connected to an upper edge of the screen, and a lower arm with a lower end that extends into the housing and that is pivoted to the housing. The drive device includes a motor coupled to the roller, and a drive switch connected electrically to the motor. The drive switch is operable so as to activate the motor to operate in one of a first mode, wherein the motor rotates the roller for moving the arm unit to a stretching position, and a second mode, wherein the motor rotates the roller for moving the arm unit to a retracting position. A control unit includes a solar collector plate for collecting solar energy, a converter circuit connected to the solar collector plate for converting the solar energy into electrical energy, and a switch control circuit which interconnects the converter circuit and the motor. The switch control circuit includes first and second contact switches disposed in the housing.

2 Claims, 6 Drawing Sheets

MOTORIZED SUN-SHADE ASSEMBLY

CROSS-REFERENCE TO RELATED APPLICATION

This is a continuation-in-part (CIP) application of U.S. patent application Ser. No. 09/204,962, filed Jan. 21, 1999, now abandoned.

BACKGROUND OF THE INVENTION

1. Field of the Invention

The invention relates to a sun-shade assembly for a automobile, more particularly to a motorized sun-shade assembly.

2. Description of the Related Art

A sun-shade assembly is generally installed in an automobile adjacent to a rear window for shading the interior of the automobile from sun-light.

U.S. Pat. No. 5,791,721 discloses a motorized sun-shade assembly that includes a base unit, a screen unit, a pair of pivot arms, and a drive unit. The screen unit includes a lower horizontal rod mounted rotatably on the base unit, an upper horizontal shaft, and a screen with a bottom edge connected to the horizontal rod and a top edge connected to the horizontal shaft. Each of the pivot arms has a lower end portion mounted pivotally on the base unit, and an upper end portion slidably engaging the horizontal shaft. The drive unit is mounted on the base unit and includes a motor with a rotatable drive shaft which is coupled to one end of the horizontal rod. The motor is operable in a first mode, wherein the pivot arms pivot away from each other to move the horizontal shaft upwardly and stretch the screen, and in a second mode, wherein the pivot arms pivot toward each other to move the horizontal shaft downwardly and permit winding of the screen on the horizontal rod. The drive unit further includes a control unit connected electrically to the motor. The control unit is operable so as to control operation of the motor in the first and second modes, and includes a solar collector plate for collecting solar energy, a converter circuit connected to the solar collector plate for converting the solar energy collected by the solar collector plate into electrical energy, and a switch control circuit which interconnects the converter circuit and the motor. The switch control circuit includes a timer switch for deactivating automatically the motor after a preset time during operation of the motor in the first mode, and a contact switch disposed on the base unit and actuated by one of the pivot arms for deactivating the motor when the screen is wound fully on the horizontal rod.

It is noted that the timer switch does not ensure that a desired length of the screen has been stretched out of the housing when the motor is deactivated after operating in the first mode. Moreover, the timer switch can not be easily configured by the user to suit a particular window dimension of a specific type of automobile.

SUMMARY OF THE INVENTION

Therefore, the object of the present invention is to provide a motorized sun-shade assembly which can overcome the aforementioned drawbacks.

According to the present invention, a motorized sun-shade assembly includes a sun-shade device and a drive device. The sun-shade device includes an elongated housing, an elongated horizontal roller mounted rotatably in the housing, a screen having a lower edge connected to the horizontal roller and an upper edge, and a stretching arm unit having an upper arm with an upper end connected to the upper edge of the screen, and a lower arm with a lower end that extends into the housing and that is pivoted to the housing. The arm unit is pivotable between a retracting position, in which the upper arm of the arm unit is disposed adjacent to the housing and the screen is wound on the horizontal roller, and a stretching position, in which the upper arm of the arm unit is moved away from the housing and the screen is unwound from the horizontal roller to stretch a length of the screen out of the housing. The drive device includes a motor coupled to the horizontal roller, a drive switch connected electrically to the motor, and a control unit connected electrically to the motor. The motor is operable in a first mode, wherein the motor rotates the horizontal roller to move the arm unit to the stretching position, and in a second mode, wherein the motor rotates the horizontal roller to move the arm unit to the retracting position. The drive switch is operable so as to activate the motor to operate in a selected one of the first and second modes. The control unit includes a solar collector plate for collecting solar energy, a converter circuit connected to the solar collector plate for converting the solar energy collected by the solar plate into electrical energy, and a switch control circuit which interconnects the converter circuit and the motor. The switch control circuit includes a first contact switch disposed in the housing and actuated by the arm unit for deactivating operation of the motor in the first mode when the arm unit reaches the stretching position while pivoting away from the retracting position, and a second contact switch disposed in the housing and actuated by the arm unit for deactivating operation of the motor in the second mode when the arm unit reaches the retracting position while pivoting away from the stretching position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
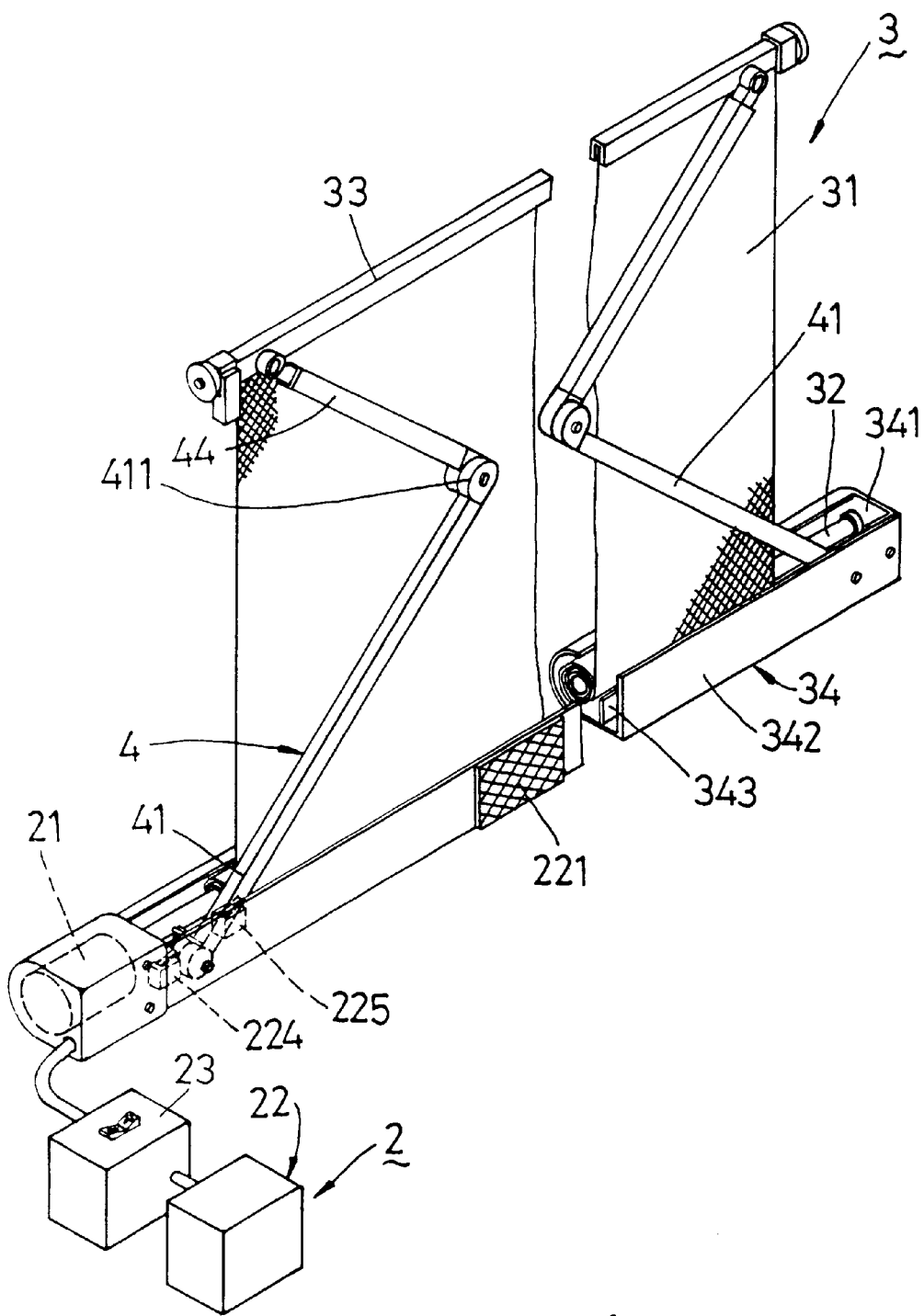
FIG. 1 is a perspective view of the first preferred embodiment of a motorized sun-shade assembly according to the present invention.

Before the present invention is described in greater detail, it should be noted that like elements are denoted by the same reference numerals throughout the disclosure.

Figure 2:
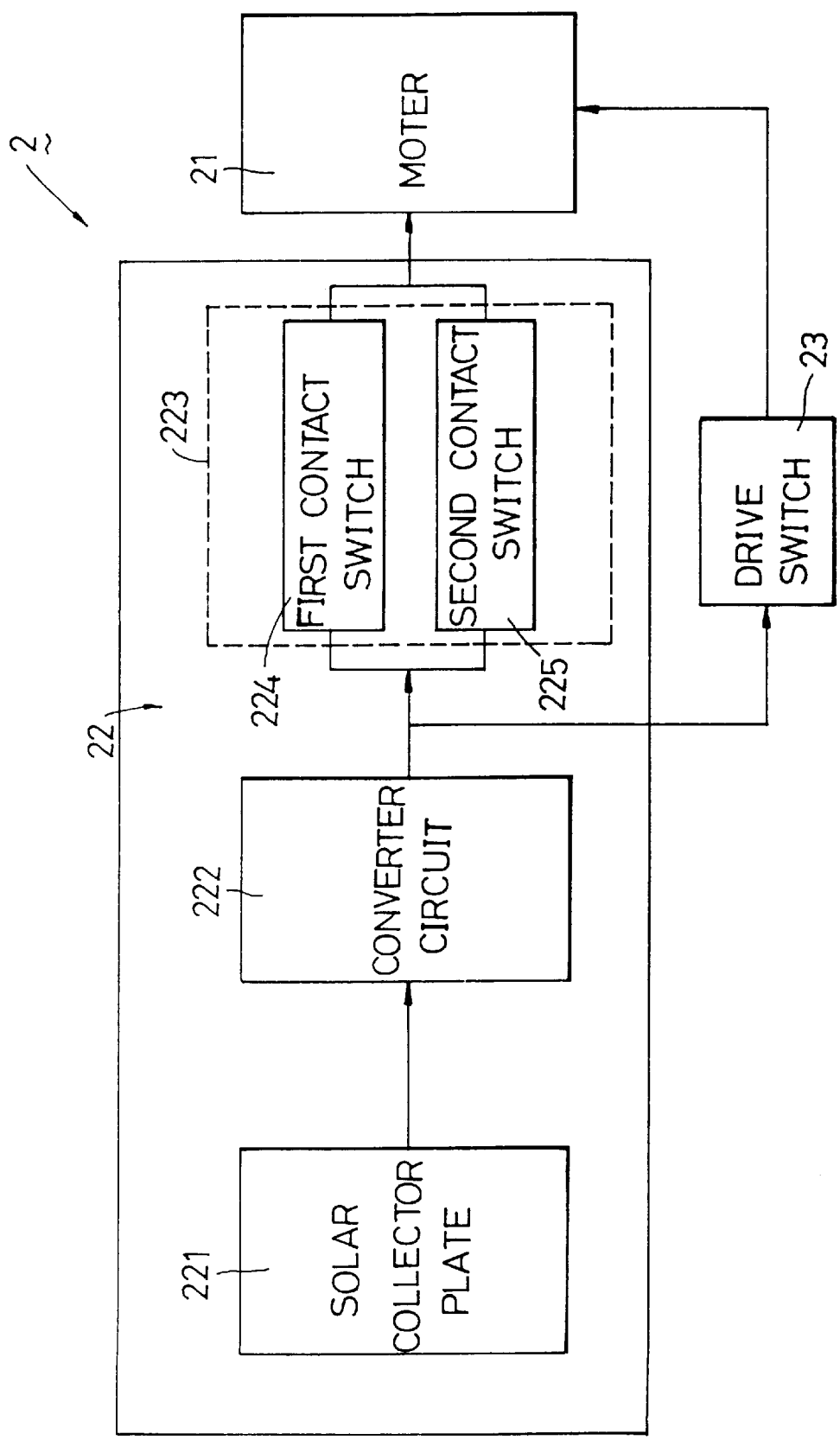
FIG. 2 is a schematic circuit block diagram of a drive device of the first preferred embodiment.

Referring to FIGS. 1 and 2, the first preferred embodiment of a motorized sun-shade assembly according to the present invention is shown to comprise a sun-shade device 3 and a drive device 2.

Figure 3:
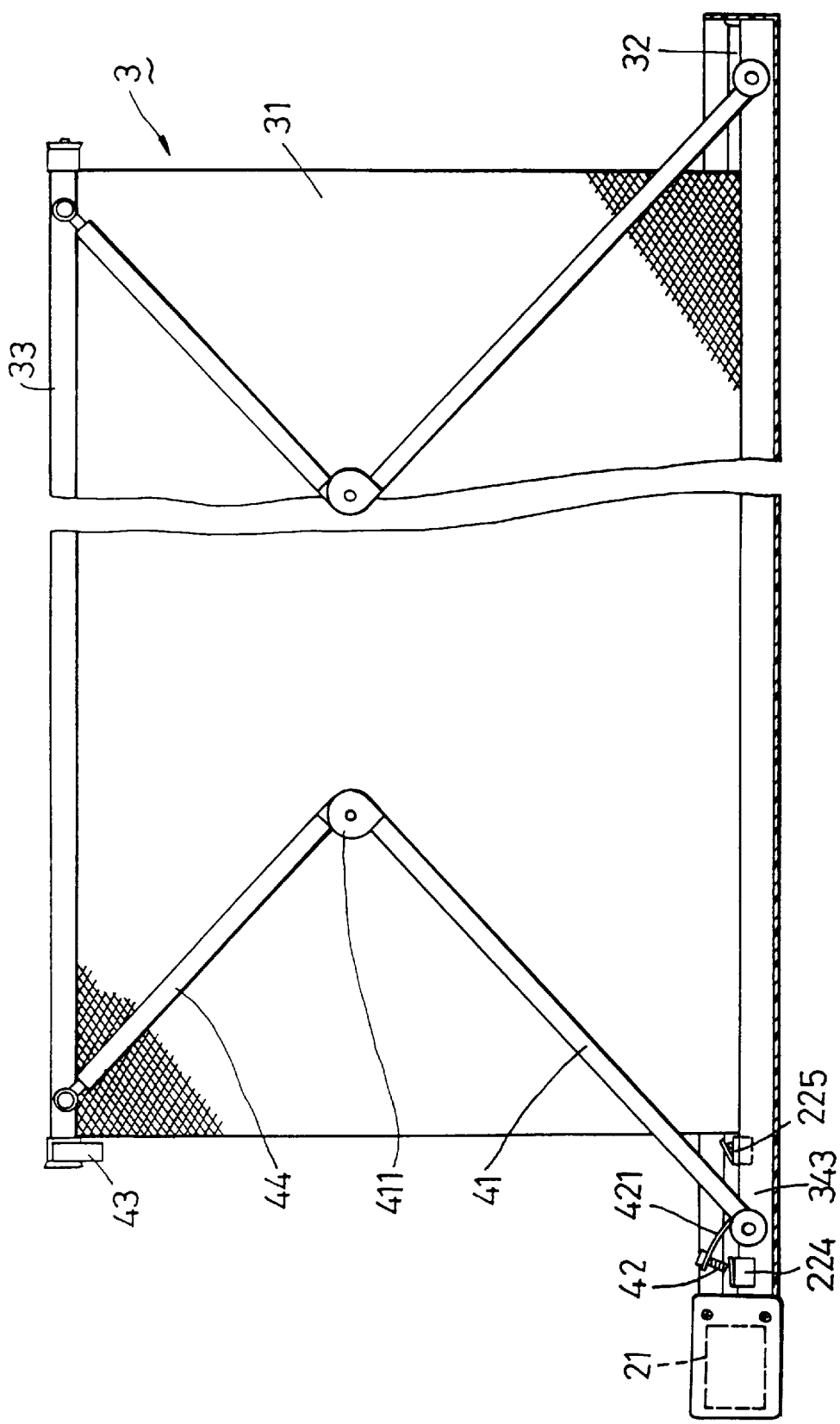
FIG. 3 is a schematic view of the first preferred embodiment illustrating the screen when in a stretched state.
Figure 4:
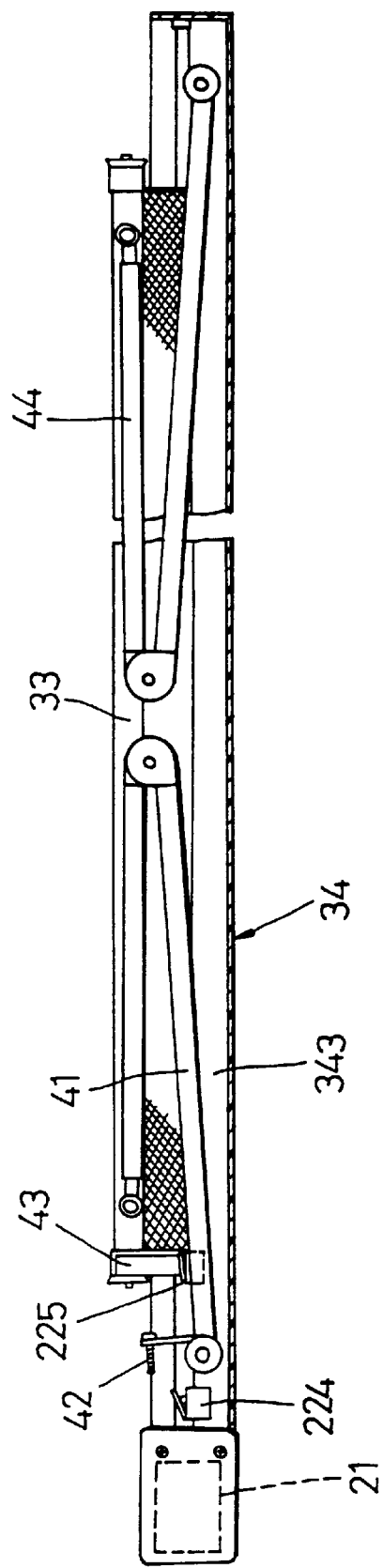
FIG. 4 is a schematic view of the first preferred embodiment illustrating the screen when wound on a horizontal roller.

The sun-shade device 3 includes an elongated housing 34, an elongated roller 32, a horizontal rod 33, and a pair of stretching arm units 4. The housing 34 is formed with an opening 341 on a top side, and has a front wall 342 formed on a front end and an inner wall 343 parallel to the front wall 342. The roller 32 is mounted rotatably in the housing 34 adjacent to the inner wall 343. A screen 31 has a lower edge connected to the roller 32 and an upper edge connected to the rod 33. Each of the stretching arm units 4 includes an upper arm 44 with an upper end connected to the rod 33, a lower arm 41 with a lower end that extends into the housing 34 and that is pivoted to the housing 34, and a spring-loaded pivot joint 411 which interconnects pivotally the upper and lower arms 44, 41 and which biases the upper arm 44 away from the lower arm 41 to aid in stretching of the screen 31 out of the housing 34. The arm units 4 are pivotable between a retracting position, in which the upper arms 44 of the arm units 4 are disposed adjacent to the housing 34 and the screen 31 is wound on the roller 32, as shown in FIG. 4, and a stretching position, in which the upper arms 44 of the arm units 4 are moved away from the housing 34 and the screen 31 is unwound from the roller 32 to stretch a length of the screen 31 out of the housing 34, as shown in FIG. 3.

The drive device 2 includes a motor 21 coupled to the roller 32, a drive switch 23 connected electrically to the motor 21, and a control unit 22 connected electrically to the motor 21. The motor 21 is operable in a first mode, wherein the motor 21 rotates the roller 32 to move the arm units 4 to the stretching position, and in a second mode, wherein the motor 21 rotates the roller 32 to move the arm units 4 to the retracting position. The drive switch 23 is operable so as to activate the motor 21 to operate in a selected one of the first and second modes. As shown in FIG. 2, the control unit 22 includes a solar collector plate 221 disposed on the front wall 342 of the housing 34 for collecting solar energy, a converter circuit 222 connected to the solar collector plate 221 for converting the solar energy collected by the solar collector plate 221 into electrical energy, and a switch control circuit 223 which interconnects the converter circuit 222 and the motor 21. The switch control circuit 223 includes a first contact switch 224 and a second contact switch 225 disposed in the housing 34. The first contact switch 224 is actuated by a first stub 42 formed on an extending piece 421 that extends from the lower arm 41 of one of the arm units 4 for deactivating operation of the motor 21 in the first mode when the arm units 4 reach the stretching position while pivoting away from the retracting position, as shown in FIG. 3. The second contact switch 225 is actuated by a second stub 43 formed on one end of the rod 33 for deactivating operation of the motor 21 in the second mode when the arm units 4 reach the retracting position while pivoting away from the stretching position, as shown in FIG. 4.

Figure 5:
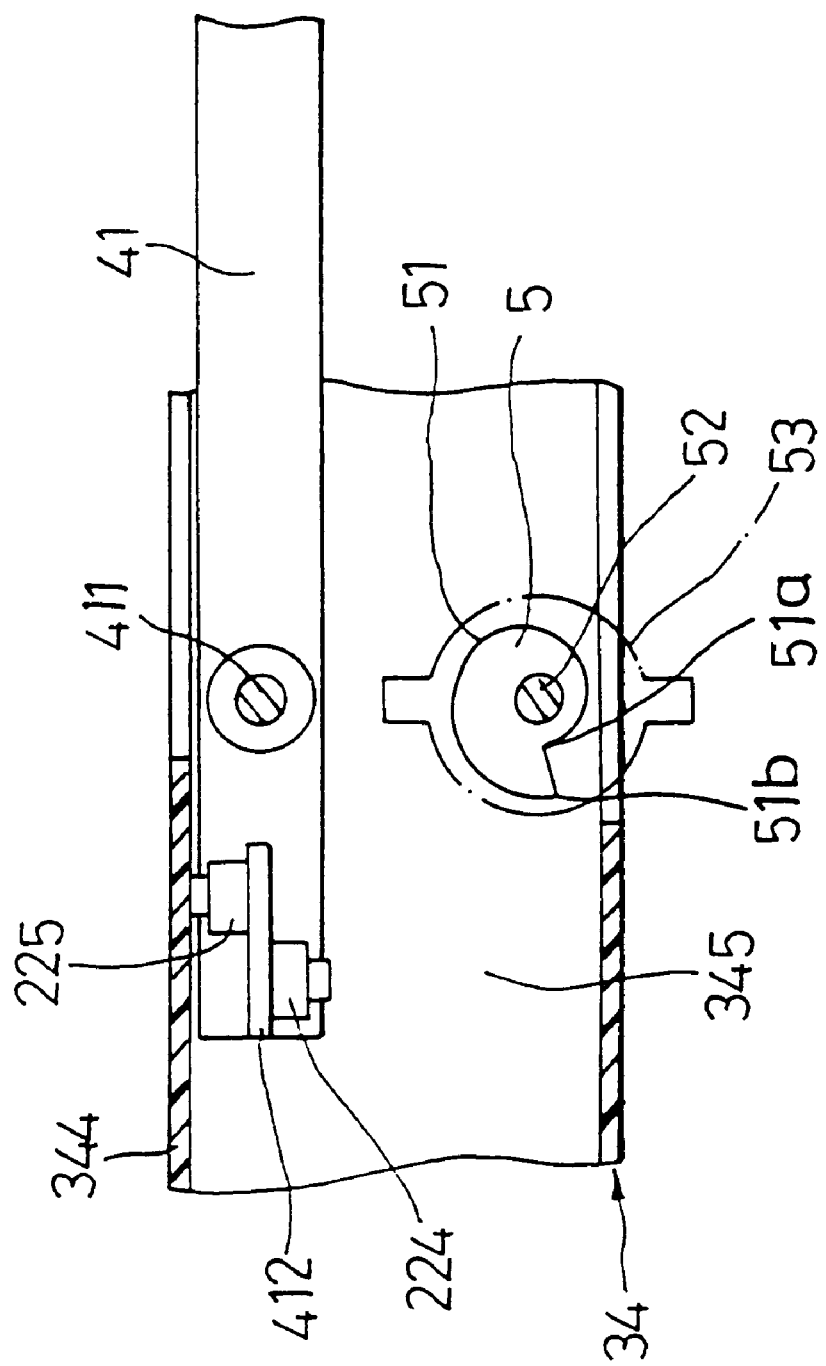
FIG. 5 is a schematic fragmentary sectional view illustrating the second preferred embodiment of the present invention, where an arm unit of the sun-shade assembly is in a retracting position.

The second preferred embodiment of a motorized sun-shade assembly according to the present invention comprises a sun-shade device and a drive device generally similar to those shown in FIG. 1, and further comprises a cam wheel. As such, the detailed structures of the sun-shade device and the drive device of the second preferred embodiment will not be described further herein for the sake of brevity. Referring to FIG. 5, the cam wheel 5 is mounted rotatably inside an elongated housing 34 of the sun-shade device adjacent to and below a lower arm 41 of an arm unit of the sun-shade device. The lower arm 41 is pivoted to the housing 34 about a pivot shaft 411 that is disposed generally above the cam wheel 5. The cam wheel 5 is rotatable about a rotary axle 52 that is mounted between two opposite side walls 345 of the housing 34, and has a cam surface 51 with a starting end 51a and a terminating end 51b. The cam surface 51 increases gradually in radius from the starting end 51a to the terminating end 51b with respect to the rotary axle 52. The cam wheel 5 is provided with a control knob 53 which is disposed out of the housing 34.

A first contact switch 224 of the drive device is mounted on a bottom side of a plate extension 412 that is formed on the lower arm 41, and is connected electrically to a motor (not shown). A second contact switch 225 of the drive device is mounted on a top side of the plate extension 412, and is connected electrically to the motor. The first and second contact switches 224, 225 are thus movable together with the lower arm 41.

When the lower arm 41 moves to a retracting position, as shown in FIG. 5, to wind a screen (not shown) on a roller (not shown) of the sun-shade device, the second contact switch 225 is brought into contact with a top wall 344 of the housing 34 to enable the second contact switch 225 to deactivate the motor to stop further pivoting movement of the lower arm 41.

Figure 6:
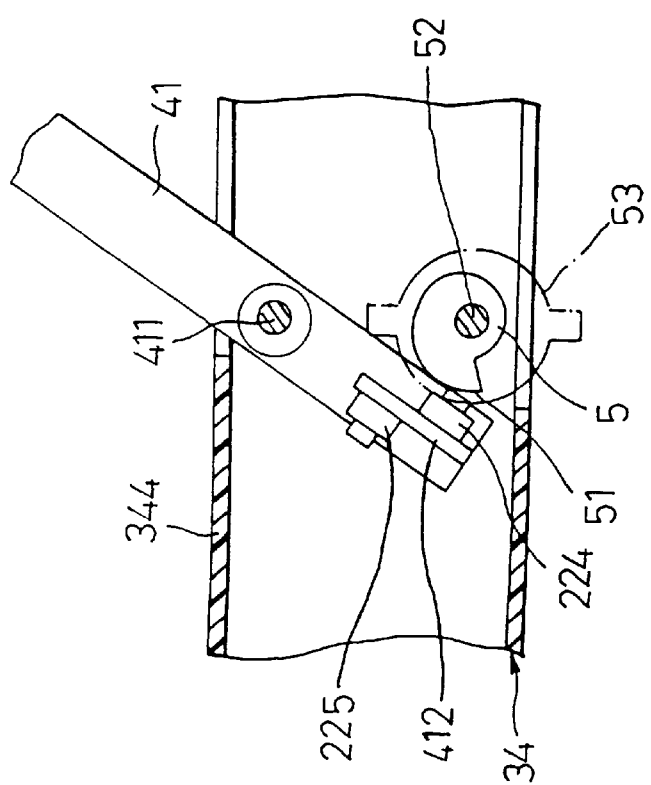
FIG. 6 is a schematic fragmentary sectional view illustrating the second preferred embodiment, where the arm unit of the sun-shade assembly is in a stretching position.

When the lower arm 41 moves to a stretching position, as shown in FIG. 6, to stretch a length of the screen (not shown) out of the housing 34, the first contact switch 224 is brought into contact with the cam surface 51 of the cam wheel 5 in order to enable the first contact switch 224 to deactivate the motor to stop further pivoting movement of the lower arm 41 away from the retracting position.

Figure 7:
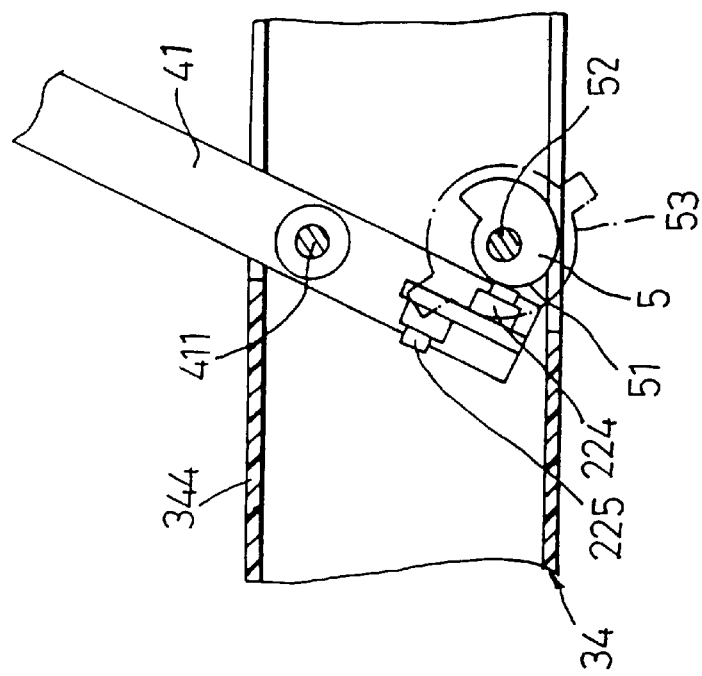
FIG. 7 is a schematic fragmentary sectional view illustrating the second preferred embodiment, where a cam wheel is operated to adjust the stretching position of the arm unit.

Referring to FIG. 7, if it is desired to adjust the length of the screen that is stretched out of the housing 34 when the lower arm 41 is in the stretching position in order to suit a particular window dimension of a specific type of automobile, the control knob 53 that is disposed out of the housing 34 is rotated to rotate the cam wheel 5. As the cam wheel 5 is rotated, the angular orientation of the cam surface 51 is varied, and thus, the point of contact between the first contact switch 224 and the cam surface 51 is changed. When the cam wheel 5 is disposed in the position shown in FIG. 7, the first contact switch 224 is displaced from the rotary axle 52 of the cam wheel 5 by a distance shorter than that when the cam wheel 5 is disposed in the position shown in FIG. 6. The length of the screen that is stretched out of the housing 34 when the cam wheel 5 is in the position shown in FIG. 7 is thus longer than that when the cam wheel 5 is in the position shown in FIG. 6.

Since it is generally not necessary to adjust the retracting position of the lower arm 41, the position of the second contact switch 225 is not critical in the present invention, as long as the second contact switch 225 can be operated when the lower arm 41 moves to the retracting position, where the screen of the sun-shade device is wound fully on the roller. For example, the second contact switch 225 may also be mounted on a bottom side of the top wall 344 of the housing 34 adjacent to the lower arm 41 such that the lower arm 41 is in contact with the second contact switch 225 when the lower arm 41 moves to the retracting position.

Since the cam wheel 5 can be easily rotated by operating the rotary knob 53 that is disposed out of the housing 34, adjustment of the length of the screen that is stretched out of the housing 34 when the lower arm 41 pivots to the stretching position is easy to conduct. In addition, the adjustment operation can be conducted without the need for moving the first contact switch 224. Moreover, with the use of the cam wheel 5 that has a cam surface 51 which changes gradually in radius with respect to the rotary axle 52, the adjustment operation can be conducted in a relatively precise manner.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A motorized sun-shade assembly comprising:
   a sun-shade device including
      an elongated housing,
      an elongated horizontal roller mounted rotatably in said housing,
      a screen having a lower edge connected to said horizontal roller and an upper edge, and
      a stretching arm unit having an upper arm with an upper end connected to said upper edge of said screen, and a lower arm with a lower end that extends into said housing and that is pivoted to said housing, said arm unit being pivotable between a retracting position, in which said upper arm of said arm unit is disposed adjacent to said housing and said screen is wound on said horizontal roller, and a stretching position, in which said upper arm of said arm unit is moved away from said housing and said screen is unwound from said horizontal roller to stretch a length of said screen out of said housing; and
   a drive device including
      a motor coupled to said horizontal roller, and operable in a first mode, wherein said motor rotates said horizontal roller to move said arm unit to the stretching position, and in a second mode, wherein said motor rotates said horizontal roller to move said arm unit to the retracting position,
      a drive switch connected electrically to said motor and operable so as to activate said motor to operate in a selected one of the first and second modes, and
      a control unit connected electrically to said motor, said control unit including a solar collector plate for collecting solar energy, a converter circuit connected to said solar collector plate for converting the solar energy collected by said solar collector plate into electrical energy, and a switch control circuit which interconnects said converter circuit and said motor, said switch control circuit including a first contact switch disposed in said housing and actuated by said arm unit for deactivating operation of said motor in the first mode when said arm unit reaches the stretching position while pivoting away from the retracting position, and a second contact switch disposed in said housing and actuated by said arm unit for deactivating operation of said motor in the second mode when said arm unit reaches the retracting position while pivoting away from the stretching position;

further comprising a cam wheel mounted rotatably inside said housing adjacent to said lower end of said arm unit, said cam wheel being rotatable about a rotary axis and having a cam surface with starting and terminating ends, said cam surface increasing gradually in radius from said starting end to said terminating end with respect to the rotary axis;

said first contact switch being mounted on said lower end of said arm unit and moving with said lower end of said arm unit so as to be brought into contact with said cam surface of said cam wheel in order to enable said first contact switch to deactivate said motor to stop further pivoting movement of said arm unit away from the retracting position;

rotation of said cam wheel inside said housing varying angular orientation of said cam surface to vary in turn point of contact between said first contact switch and said cam surface to adjust the length of said screen that is stretched out of said housing when said arm unit pivots to the stretching position.

2. The motorized sun-shade assembly as claimed in claim 1, wherein said cam wheel is provided with a control knob that is disposed out of said housing to facilitate rotation of said cam wheel relative to said housing.

\* \* \* \* \*